(12) United States Patent
Yoshida et al.

(10) Patent No.: US 6,937,429 B2
(45) Date of Patent: Aug. 30, 2005

(54) MAGNETIC DISK STORAGE APPARATUS AND METHOD FOR CONTROLLING MAGNETIC DISK STORAGE APPARATUS

(75) Inventors: Kenji Yoshida, Maebashi (JP); Hiroshi Satou, Takasaki (JP); Kenji Nishimura, Takasaki (JP)

(73) Assignees: Hitachi ULSI Systems Co., Ltd., Tokyo (JP); Renesas Technology Corporation, Tokyo (JP)

( * ) Notice: Subject to any disclaimer, the term of this patent is extended or adjusted under 35 U.S.C. 154(b) by 273 days.

(21) Appl. No.: 10/142,988

(22) Filed: May 13, 2002

(65) Prior Publication Data

US 2002/0176202 A1 Nov. 28, 2002

(30) Foreign Application Priority Data

May 23, 2001 (JP) .......................... 2001-153907

(51) Int. Cl.[7] .............................................. G11B 5/596
(52) U.S. Cl. ......................... 360/78.06; 360/70; 360/75
(58) Field of Search ........................ 360/70, 71, 73.01, 360/73.03, 75, 78.01, 78.04, 78.06, 78.11, 78.12

(56) References Cited

U.S. PATENT DOCUMENTS

| | | | |
|---|---|---|---|
| 5,495,156 A | * | 2/1996 | Wilson et al. ............... 318/368 |
| 5,969,899 A | * | 10/1999 | Utenick et al. .......... 360/78.04 |
| 6,560,057 B1 | * | 5/2003 | Klaassen et al. ............... 360/75 |
| 6,721,119 B1 | * | 4/2004 | Hassan et al. ................. 360/75 |

FOREIGN PATENT DOCUMENTS

| | | |
|---|---|---|
| JP | 8-63920 | 8/1994 |
| JP | 11-317032 | 11/1998 |

* cited by examiner

Primary Examiner—David Hudspeth
Assistant Examiner—Jason Olson
(74) Attorney, Agent, or Firm—Reed Smith LLP; Stanley P. Fisher, Esq.; Juan Carlos A. Marquez, Esq.

(57) ABSTRACT

In a magnetic disk storage apparatus, when power supply is stopped, a magnetic head can be retracted safely and quickly so as not to be damaged. There are provided a back electromotive a force detector that detects back electromotive forces developed in coils of a voice coil motor for moving a magnetic head when power a supply is stopped, and a brake controller that judges a movement speed of the magnetic head from the detected back electromotive forces, and brakes the voice coil motor when the movement speed is greater than a preset first limited speed.

6 Claims, 5 Drawing Sheets

MAGNETIC DISK STORAGE APPARATUS AND METHOD FOR CONTROLLING MAGNETIC DISK STORAGE APPARATUS

BACKGROUND OF THE INVENTION

The present invention relates to technology for controlling a magnetic disk storage apparatus, and more particularly to technology effectively applied to motor control when power supply is stopped, for example, when power failure occurs. To be more specific, the present invention relates to technology effectively used for control of a voice coil motor that moves a magnetic head for reading and writing information from and to storage tracks on a magnetic disk in, e.g., a hard disk drive in a radial direction of the disk.

A magnetic disk storage apparatus includes a spindle motor for rotating the magnetic disk, and a voice coil motor that moves (seek operation) a magnetic head for reading and writing information from and to storage tracks on the magnetic disk in a radial direction along the surface of the disk. A hard disk drive is configured so that a magnetic head glides over a disk surface by dint of wind pressure caused by disk rotation, and if disk rotation is stopped, the magnetic head comes into contact with the disk surface, possibly damaging the disk.

Accordingly, when the disk rotation is stopped, the magnetic head is retracted to a support called a lamp placed in a standby position outside the disk. Hence, when seek operation of the head is started, the magnetic head must be moved from the lamp position to over the disk. At this time, if the magnetic head is moved too fast by the voice coil motor, the magnetic head may come into contact with a disk surface and damage the disk. Thus, conventionally, it has been common to monitor back electromotive forces of the voice coil motor to control movement speeds of the magnetic head.

SUMMARY OF THE INVENTION

In a hard disk drive, for the same reason as the above described need to retract a magnetic disk to a lamp outside disk when disk rotation is stopped, the magnetic head must be retracted also when power failure occurs. However, when power failure occurs, a control circuit of a voice coil motor is powered off and a motor becomes out of control. Therefore, conventionally, control has been generally performed in a manner that, as soon as power failure is detected, drives the motor to move the magnetic head at a high speed in a direction of the outside lamp and thereafter waits for the power to drop naturally.

However, when power failure occurs, the magnetic head cannot be moved at too high a speed to retract by the voice coil motor because the excessively high speed could cause the magnetic head to drop onto the disk surface due to impact of collision with the lamp and resulting reaction and be damaged. For this reason, the magnetic head must have been retracted at some limited speed. However, power failure is unpredictable; it may occur when the magnetic head is being moved in the vicinity of inner tracks in a direction opposite to the lamp. It has become apparent that an attempt to control, in such a case, the voice coil motor to retract the magnetic head with a limited speed causes its driving force to act as a brake to the motor at first but the magnetic head to collide with an inside rotation axis as the break becomes too weak and be possibly damaged.

An object of the present invention is to provide technology for controlling a voice coil motor that enables a magnetic head to be retracted safely and quickly so as not to be damaged when power supply is stopped in a magnetic disk storage apparatus.

The above described object and other objects, and characteristics of the present invention will become apparent from the description of this specification and the accompanying drawings.

Typical ones of intentions disclosed by the present patent application will be briefly described below.

There is provided a magnetic disk storage apparatus comprising: a first motor for rotating magnetic disk; a magnetic head for reading information from storage tracks on magnetic disk rotated by the first motor; a second motor for moving the magnetic head over the disk; and a second motor driving control circuit for controlling the movement of the magnetic head by controlling drive currents of the second motor, wherein there are provided a back electromotive force detecting means for detecting back electromotive forces developed in coils of the second motor when power supply is stopped, and a brake control means for judging a movement speed of the magnetic head from detected back electromotive forces and braking the second motor when the movement speed is greater than a preset first limited speed.

According to the above described means, when power supply is stopped, the motor can be controlled to slow down the speed of the magnetic head moving to a retract position to a proper movement speed. Thereby, it can be prevented that the magnetic head collides with the lamp at the retract position and, as a result, drops onto a disk surface and is damaged.

There is also provided a magnetic disk storage apparatus comprising: a first motor for rotating magnetic disk; a magnetic head for reading information from storage tracks on magnetic disk rotated by the first motor; a second motor for moving the magnetic head over the disk; and a second motor driving control circuit for controlling the movement of the magnetic head by controlling drive currents of the second motor, wherein there are provided a back electromotive force detecting means for detecting back electromotive forces developed in coils of the second motor when power supply is stopped, and a brake control means for judging a movement speed of the magnetic head from detected back electromotive forces and braking the second motor when a movement speed in one direction is greater than a preset first limited speed and when greater than a second limited speed in a direction opposite to the one direction.

According to the above described means, when power supply is stopped, even if the magnetic head is moving in any of a direction of an outside retract position and a direction of an inside disk rotation axis, the motor can be controlled to a proper movement speed. Accordingly, the magnetic head is prevented from colliding with the lamp at the retract position or the disk rotation axis, whereby the magnetic head is prevented from being damaged.

Herein, preferably, there is provided a retract control means for driving the second motor to move the magnetic head to the retract position at a speed smaller than a predetermined speed after braking the second motor by the brake control means. Thereby, not only the magnetic head can be retracted at a limited speed or slower but also it can be prevented that the retract operation slows because of too low a retract speed, so that the magnetic head can be retracted quickly.

After the second motor is braked by the brake control means, redetection of back electromotive forces of the second motor by the back electromotive force detecting means, judgement of a movement speed of the magnetic head from the detected back electromotive forces, and braking by w the brake control means based on the judgement result are repeated until a head movement speed becomes below a limited speed. This ensures reduction in movement speeds even in the case where head movement speeds do not drop below a limited speed as a result of one brake control.

Alternatively, movement speeds of the magnetic head may be judged in plural stages from back electromotive forces of the second motor detected by the back electromotive force detecting means so that a braking time is changed by the brake control means, based on the judgement result. This makes it possible to drop head movement speeds below a limited speed by one brake control.

Moreover, preferably, when a predetermined time elapses after a drive current to the second motor is shut off, a movement speed of the magnetic head is judged from an output voltage of the back electromotive force detecting means. Although it is difficult to accurately detect back electromotive forces by currents flowing through the coils immediately after the drive current to the motor is shut off, when a predetermined time elapses after the drive current to the motor is shut off, by judging a movement speed of the magnetic head from an output voltage of the back electromotive force detecting means, brake control can be performed more accurately.

There may also be provided a setting means capable of arbitrarily setting a judgement level for judging a movement speed of the magnetic head from an output of the back electromotive force detecting means. Thereby, regardless of variations in elements and different system specifications, the magnetic head can be safely retracted at a speed optimum for the system.

Moreover, preferably, the magnetic disk storage apparatus may be constructed so that a brake current to the second motor is obtained from back electromotive forces of the first motor. Thereby, without the need to provide a power backup means, the magnetic head can be safely retracted when power supply is stopped.

Diodes may be provided to rectify back electromotive force currents of the first motor. Thereby, slight addition of elements enables backup power to be obtained to retract the magnetic head when power supply is stopped.

Moreover, there is provided a method of controlling a head moving motor of the present invention in a magnetic disk storage apparatus comprising: a disk rotating motor for rotating magnetic disk; a magnetic head for reading information from storage tracks on magnetic disk rotated by the disk rotating motor; a head moving motor for rotating the magnetic head over the disk; and a head moving motor driving control circuit for controlling the movement of the magnetic head by controlling drive currents of the head moving motor, wherein the method comprises the steps of: detecting back electromotive forces developed in coils of the head moving motor when power supply is stopped; judging a movement speed of the magnetic head from the detected back electromotive forces; and braking the head moving motor when a movement speed in one direction is greater than a preset first limited speed and when greater than a second limited speed in a direction opposite to the one direction.

According to the above described means, when power supply is stopped, even if the magnetic head is moving in any of a direction of an outside retract position and a direction of an inside disk rotation axis, the head moving motor can be controlled to a proper movement speed. Accordingly, the magnetic head is prevented from colliding with the lamp at the retract position or the disk rotation axis, whereby the magnetic head is prevented from being damaged.

DESCRIPTION OF THE PREFERRED EMBODIMENTS

Hereinafter, a preferred embodiment of the present invention will be described with reference to the drawings.

Figure 1:
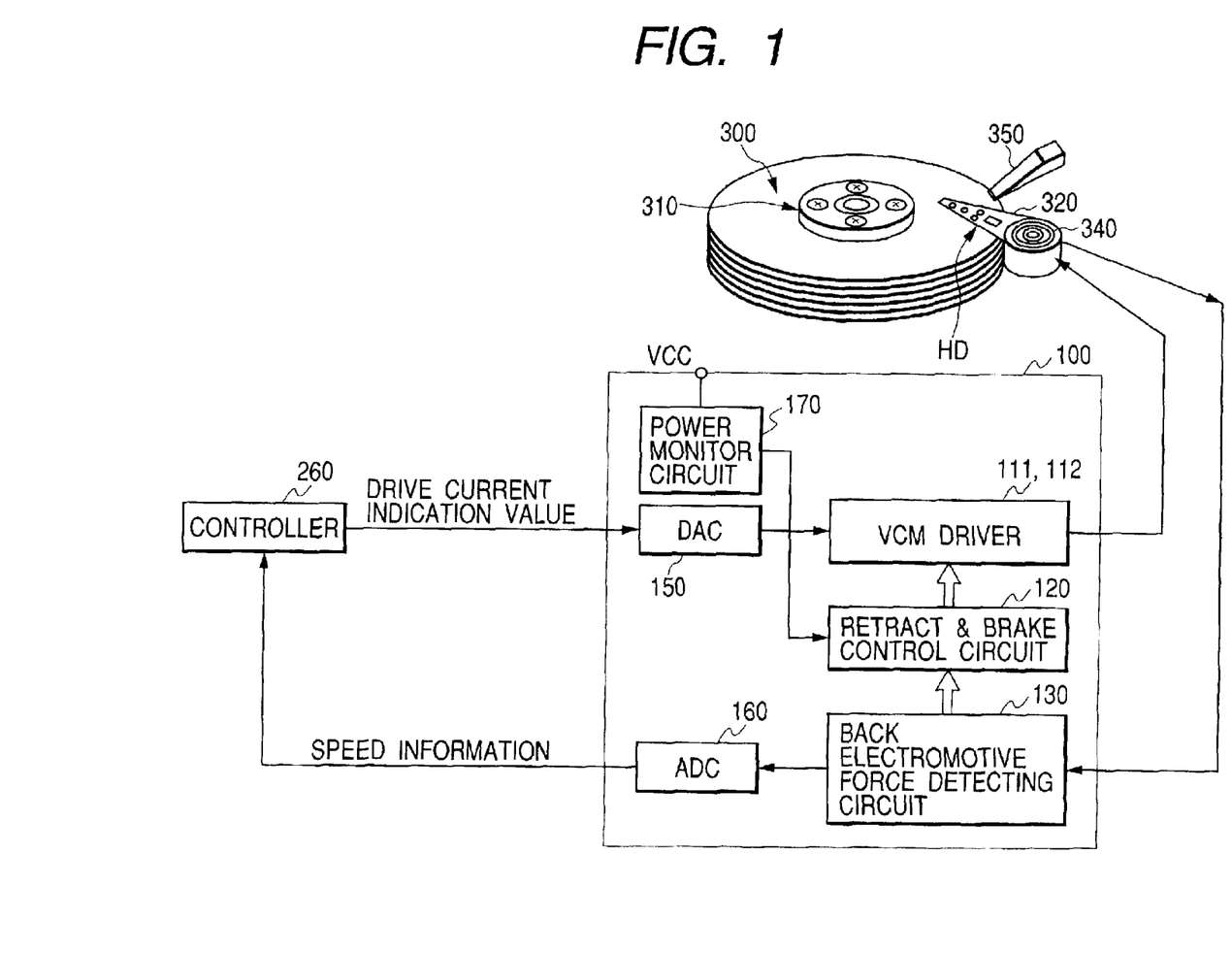
FIG. 1 is a block diagram showing a brief configuration of a voice coil motor control system in a magnetic disk storage apparatus.

FIG. 1 shows a brief configuration of a voice coil motor control system in a magnetic disk storage apparatus to which a voice coil motor driving control circuit of the present invention is applied.

As shown in FIG. 1, a magnetic disk storage apparatus of this embodiment comprises: magnetic disk 300; a spindle motor 310 for rotating the magnetic disk 300 at high speed; an arm 320 for holding a magnetic head for reading and writing information from and to recording tracks on the magnetic disk 300 at a tip thereof; a voice coil motor 340 for moving the magnetic head over the magnetic disk 300 via the arm; a VCM driving circuit 100 as a semiconductor integrated circuit for driving the voice coil motor 340; and a controller 260 for sending a drive current indication value to the VCM driving circuit 100, based on speed information detected by the VCM driving circuit 100. Reference numeral 350 designates a lamp placed and retracted outside the magnetic disk 300, for supporting the arm 320.

The controller 260, which comprises a microcomputer (CPU) and the like, controls operation of the entire magnetic disk storage apparatus and creates and outputs a drive current indication value, based on position information (track position) calculated by the microcomputer and speed information from the VCM driving circuit 100. The drive current indication value outputted from the controller 260 is sent to the VCM driving circuit 100 and the voice coil motor 340 is driven. In the VCM driving circuit 100 are provided motor drivers 111 and 112, a retractor & brake control circuit 120, and a back electromotive force detecting circuit 130.

Moreover, the VCM driving circuit 100 is provided with a D/A converter 150 that converts a drive current indication value of digital data format sent from the controller 260 to a drive current indication value of analog format; an A/D conversion circuit 160 that performs A/D conversion for an output voltage of the back electromotive force detecting circuit 130 to present movement speed information of the magnetic head to the controller 260; and a power monitor circuit 170 that detects power failure. The VCM drivers 111 and 112 control the magnitude and direction of a drive current to be fed through the voice coil motor 340, based on a drive current indication value sent from the controller 260.

Figure 2:
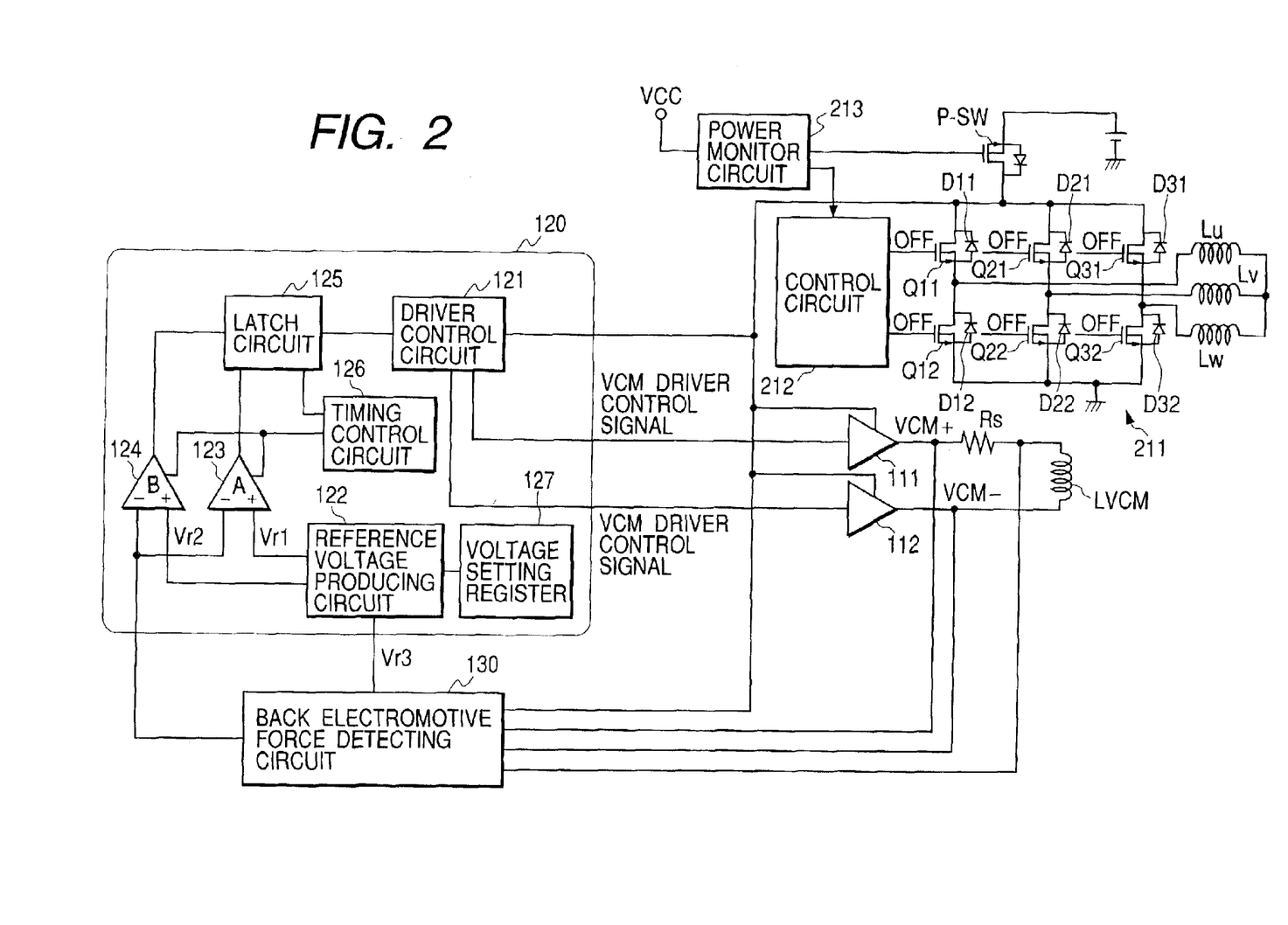
FIG. 2 is a block diagram showing an embodiment of a voice coil motor driving control circuit in the magnetic disk storage apparatus of the present invention.

FIG. 2 shows an embodiment of the voice coil motor driving control circuit in the magnetic disk storage apparatus of the present invention.

In FIG. 2, LVCM designates a driving coil of the voice coil motor moved over the magnetic disk; Rs, a resistor connected in serial with the coil LVCM to sense a current; 111 and 112, motor drivers for driving the voice coil motor by feeding currents through the coil LVCM; 120, a retractor & brake control circuit for applying the brake to the voice coil motor or retracting the magnetic head by controlling the drivers; and 130, a back electromotive force detecting circuit for detecting back electromotive force of the coil LVCM. The retractor & brake control circuit 120 controls the motor drivers 111 and 112, based on a control signal supplied from a system controller comprising a CPU (not shown) and the like, and a detection signal from the back electromotive force detecting circuit 130.

Lu, Lv, and Lw are coils of the spindle motor for rotating the magnetic disk. In this embodiment, a three-phase brushless motor is used as a spindle motor; the present invention does not limit a spindle motor to a three-phase brushless motor. 211 designates a driving circuit that comprises output MOSFETs Q11, Q12 to Q31, and Q32 connected among coupling terminals of the coils Lu, Lv, and Lw, a source voltage terminal, and a grounding terminal and feeds currents through coils of the spindle motor to rotate the motor; and 212, a circuit for controlling the driving circuit. The control circuit 212 decides phase coils through which to feed currents, turns on or off the output MOSFETs Q1 to Q32 for control individually, and feeds currents through the coils Lu, Lv, and Lw in order to thereby rotate the spindle motor.

Reference numeral 213 designates a power monitor circuit that detects whether the source voltage Vcc rises, and P-SW designates a power switch. On detecting power failure, the power monitor circuit 213 turns off the power switch P-SW and sends a signal to the control circuit 212 to turn off all the output MOSFETs Q11 to Q32. Diodes D11 to D32 are respectively connected to the output MOSFET Q11 to Q32 in opposite positions with respect to the source voltage terminal Vcc. When the output MOSFETs Q11 to Q32 are all turned off due to power failure, the diodes D11 to D32 operate as a rectifying circuit that rectifies back electromotive forces appearing in the coils Lu, Lv, and Lw, and supplies power to the drivers 111 and 112 of the voice coil motor, the control circuit 120, and the back electromotive force detecting circuit 130.

The resistor Rs connected in serial with the coil LVCM of the voice coil motor to sense a current is provided for the following reason. If a voltage across the coil LVCM were simply measured, the measurement value would contain a potential difference resulting from a current flowing through the coil and a parasitic resistance of the coil, making it impossible to detect a correct coil back electromotive force. Therefore, a current flowing through the coil is detected in the back electromotive force detecting circuit 130 to detect a pure coil back electromotive force from which a potential difference resulting from the current and the parasitic resistance of the coil is canceled, in order that speeds at which the magnetic head is moved over the magnetic disk from the lamp can be correctly controlled.

In this embodiment, the retractor & brake control circuit 120 is provided with: a driver control circuit 121; a constant voltage producing circuit 122; comparators 123 and 124 that compare detection signals from the back electromotive force detecting circuit 130 with reference voltages Vr1 and Vr2 supplied from the constant voltage producing circuit 122; a latch circuit 125 that gets and holds output signals of the comparators 123 and 124 at proper timing; a timing control circuit 126 that produces and presents a comparison timing signal for the comparators 123 and 124 and a latch timing signal for the latch circuit 125; and register 127 that specifies a level of constant voltage produced by the constant voltage producing circuit 122. The constant voltage producing circuit 122 produces reference voltage Vr3 required in the back electromotive force detecting circuit 130 and supplies it to the back electromotive force detecting circuit 130.

The reference voltages Vr1 and Vr2 supplied to the comparators 123 and 124 are set correspondingly to the back electromotive force of the voice coil motor that corresponds to a tolerance speed of the magnetic head when retracted. The two reference voltages to be compared with are provided in order that it can be judged whether a limited speed is exceeded for each of the case where the magnetic head is moving outward of a disk (lamp direction) and the case where it is moving inward of the disk (axial direction).

As the back electromotive force detecting circuit 130 that detects a current flowing through a coil to detect a pure coil back electromotive force from which an potential difference resulting from a coil parasitic resistance is canceled, a circuit identical with a circuit disclosed in Japanese Published Unexamined Patent Application No. 2000-222837 can be used. Therefore, a description of a specific circuit example and operation is omitted.

Specific operation of the voice coil motor driving circuit 100 shown in FIG. 2 when power failure occurs will be described according to a flowchart of FIG. 3 with reference to a timing chart of FIG. 4.

Figure 3:
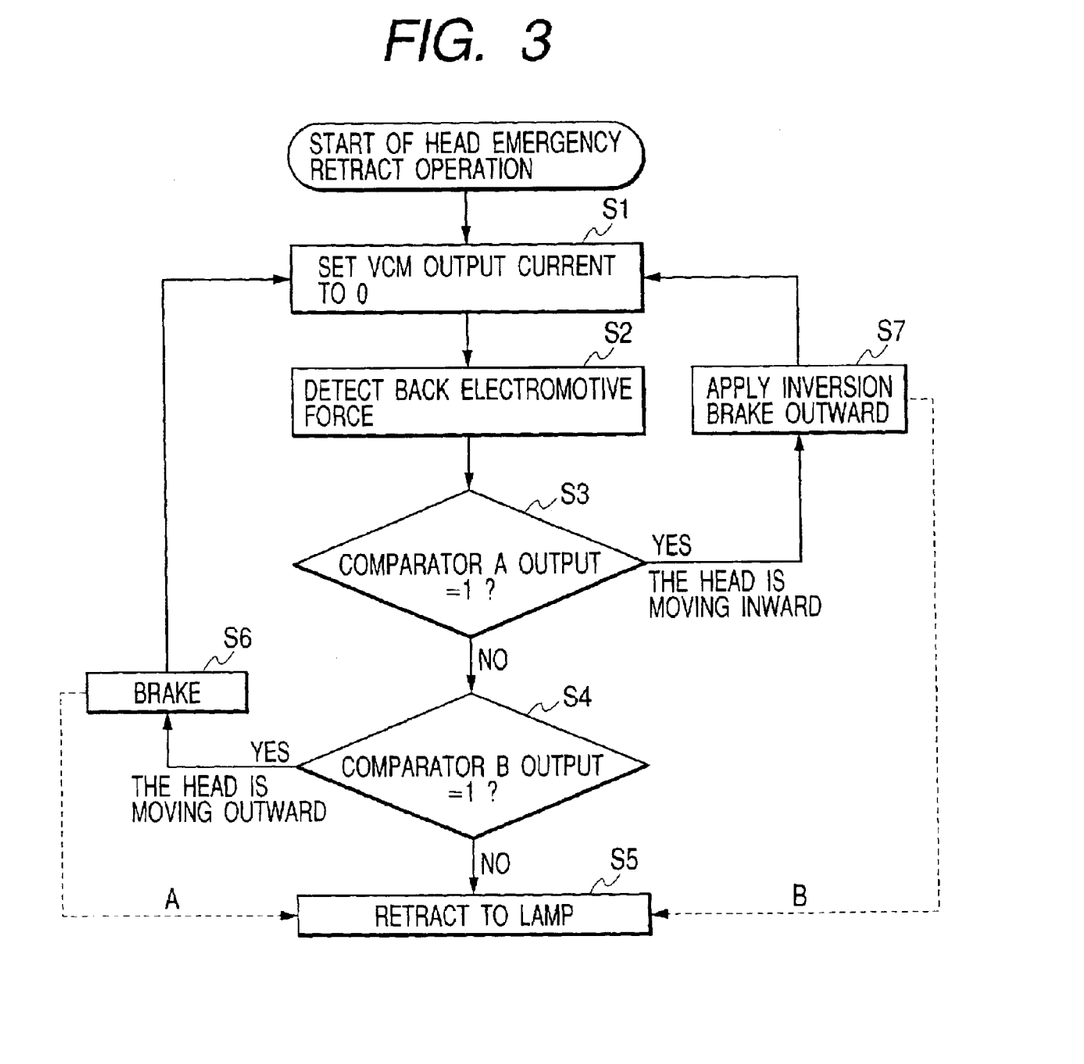
FIG. 3 is a flowchart showing a procedure of brake control operation of the voice coil motor by the voice coil motor brake control circuit of the embodiment when power failure occurs.

The retractor & brake control circuit 120 starts magnetic head emergency retract operation of FIG. 3 when a monitor signal VM indicating a power state from a power monitor circuit 170 changes to a low level indicating power failure. In the emergency retract operation, the driver circuits 111 and 112 are turned off and an output current of the coil LVCM of the voice coil motor is set to 0 (step S1).

Figure 4:
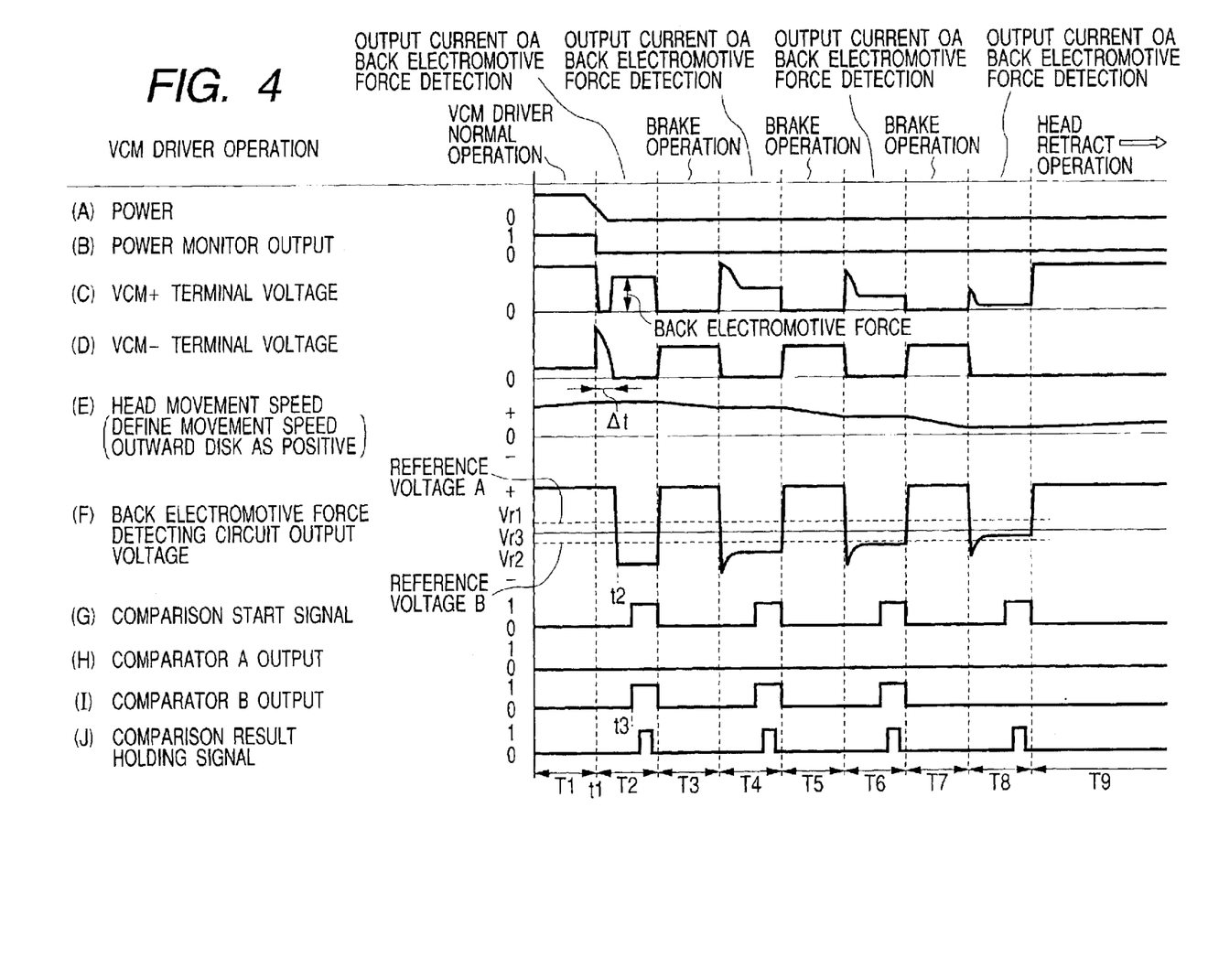
FIG. 4 is a timing chart showing the timing of signals of parts during brake control operation of the voice coil motor by the voice coil motor brake control circuit of the embodiment when power failure occurs.

FIG. 4 shows changes of individual signals in the case where retract operation is performed due to power failure when the voice coil motor is moving the magnetic head outward of a disk.

If an output current of the coil LVCM of the voice coil motor is set to 0, although voltage of one terminal VCM+ of the coil drops to ground as shown by timing t1 of FIG. 4, since a current still flows through the coil via body diodes constituting the drivers immediately after the drivers are turned off, the true back electromotive force of the coil does not develop. After a while (after Δt time elapses), a coil current becomes 0 and back electromotive force appears in one terminal VCM+ of the coil and is detected in the back electromotive force detecting circuit 130 (step S2). A path and a switch for purging a current flowing through the coil immediately after the drivers are turned off may be provided in the driver circuits 111 and 112 so that control is performed in the driver control circuit 121, whereby the Δt can be reduced.

When the back electromotive force detecting circuit 130 detects back electromotive force Vbk appearing in the coil, an output voltage of the back electromotive force detecting circuit 130 greatly changes (drops in the drawing) at timing t2 shown in FIG. 4F. The output voltage is compared with the reference voltages Vf1 and Vr2 in the comparators 123 and 124, and an output of the comparator 124 changes to a high level. The output of the comparator 124 is captured and held in the latch circuit 125 at timing t3. The driver control circuit 121 judges whether each of outputs of the comparators 123 and 124 is high level or low level (steps S3 and S4).

As described previously although the back electromotive force detecting circuit 130 of the embodiment has a function that detects a current flowing through a coil to detect a pure coil back electromotive force from which an potential difference resulting from a coil parasitic resistance is canceled, even if the back electromotive force detecting circuit 130 has such a function, since the controller 260 receiving its output is stopped or is not guaranteed to operate correctly when power failure occurs, a drive current indication value for driving the voice coil motor to retract the head, based on a detected back electromotive force is not sent from the controller 260. Accordingly, in this embodiment, as described above, when the retractor & brake control circuit 120 has become able to detect a pure back electromotive force by itself Δt time after a current to the coil is shut off, it makes comparison with the reference voltages.

In the example of FIG. 4, since an output of the comparator 124 is a high level, in step S4 of the flowchart of FIG. 3, it is judged that the magnetic head is moving outward beyond a limited speed, and at the next cycle T3, the drivers 111 and 112 are controlled to brake the motor by applying 0V to one terminal VCM+ of the coil and a predetermined voltage Va of proper magnitude to another (step S6). After the brake has been applied for a required time, control returns to step S1, where an output current to the coil is set to 0 again to detect back electromotive force.

If a movement speed of the magnetic head becomes lower than the limited speed by repeating the above operation, control goes from step S4 to S5 to retract the magnetic head to the lamp at a predetermined speed. FIG. 4 shows waveforms in the case where a movement speed of the magnetic head has become lower than the limited speed by repeating brake operation three times. From the fact that both the outputs of the comparators 123 and 124 are a low level in cycle T8 of FIG. 4, the driver control circuit 121 can know that a movement speed of the magnetic head has become lower than the limited speed. Consequently, in the next cycle T9, the magnetic head is retracted at a predetermined speed.

The above description has been made of the case where the magnetic head is moving outward of a disk beyond a limited speed when power failure occurs. In the case where the magnetic head is moving outward of a disk at a speed lower than the limited speed when power failure occurs, since not both of the outputs of the comparators 123 and 124 become a high level, the brake operation in step S6 is not performed, control shifts immediately to step S4 to S5, and cycle T8 and subsequent steps are performed in the timing chart of FIG. 4.

In the case where the magnetic head is moving inward of a disk beyond the limited speed when power failure occurs, since an output of the comparator becomes a high level, it is judged in step S3 that the head is moving inward beyond the limited speed, and control is transferred to step S7 to perform brake control for a given time repeatedly until a movement speed of the magnetic head becomes lower than the limited speed. When a movement speed of the magnetic head has become lower than the limited speed, control is transferred from step S4 to S5 to retract the magnetic head to the lamp at a predetermined speed.

The brake control in step S6 is done to prevent the head from moving beyond the limited speed in a direction of the outside lamp, while the brake control in step S7 is done to prevent the head from moving beyond the limited speed in a direction of the inside rotation axis. Therefore, making a brake control time in step S7 longer than that in step S6 would make it possible to retract the head outward more quickly.

In the control operation of the embodiment of FIG. 3, brake control is repeatedly performed until a magnetic head movement speed becomes lower than a limited speed. However, the following alternative approach may also be taken. That is, three or more comparators are provided to compare outputs of the back electromotive force detecting circuit 130 with reference voltages that are different from each other, magnetic head movement speeds at power failure are judged at plural stages, and a brake control time in step S6 or S7 of FIG. 3 is changed so that the brake is applied for a longer time for a higher detected speed, depending on the detected speed, whereby, as shown by the dashed line A or B in FIG. 3, control is transferred to step S6 immediately after the brake control to retract the magnetic head to the lamp at a predetermined speed. Alternatively, when the head is moving inward, the brake may be applied for a longer time than a case where the head is moving outward.

In the control operation of the embodiment of FIG. 3, when power failure occurs, a movement speed of the magnetic head is judged from a back electromotive force of the voice coil motor, and if it exceeds a limited speed, the brake is applied. However, the following alternative approach may also be taken. When power failure occurs, after a current is supplied to drive the voice coil motor so that the head moves toward the lamp outside a disk, a movement speed of the magnetic head is judged from a back electromotive force of the voice coil motor, and if it exceeds the limited speed, the brake is applied. This makes it possible to accelerate retract operation at the time of power failure when the magnetic head is moving inward.

Figure 5:
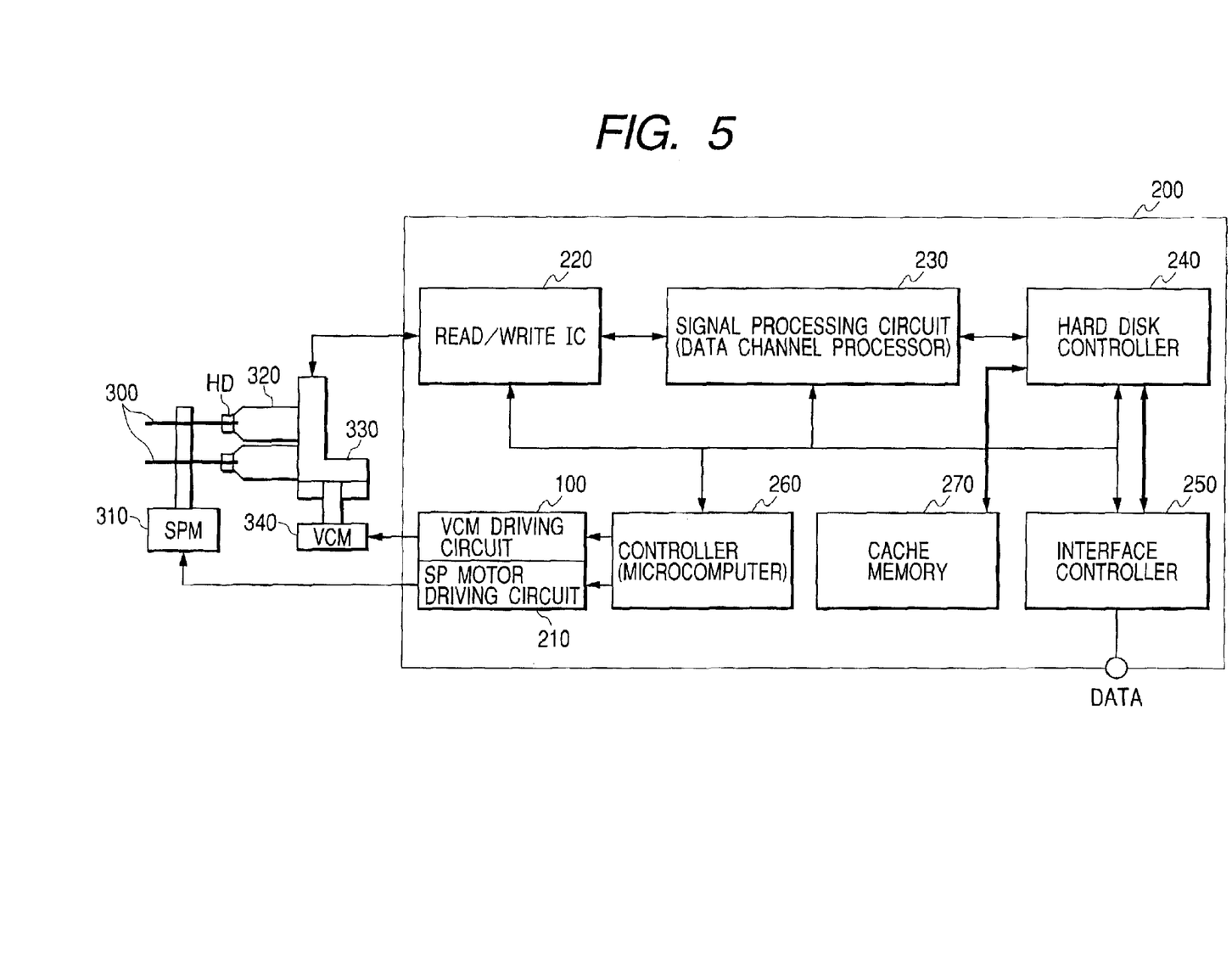
FIG. 5 is a block diagram showing a configuration of an entire magnetic disk storage apparatus to which technology of the present invention is applied.

FIG. 5 is a block diagram showing a configuration of an entire hard disk drive as an example of a magnetic disk system including a voice coil motor control system, a spindle motor control system, and a magnetic head drive control system that are configured as shown in FIG. 2.

In FIG. 5, 310 designates a spindle motor for rotating magnetic disk 300; 320, an arm having a magnetic head (including a write magnetic head and a read magnetic head) HD at a tip thereof; and 330, a carriage rotatably holding the arm 320. The voice coil motor 340 moves the magnetic head by moving the carriage 330 and the VCM driving circuit 100 performs servo control to bring the center of the magnetic head into line with the center of a track.

Reference numeral 210 designate a spindle motor driving circuit that includes the coil driving circuit 211 and its control circuit 212 as shown in FIG. 2, performs driving control for the spindle motor 310, and rotates magnetic disk at a predetermined speed. The spindle motor driving circuit 210 also operates according to control signals supplied from the controller 260, and performs servo control for the spindle motor 310 so that relative speeds of the magnetic head become constant.

Reference numeral 220 designates a read/write IC that amplifies a current corresponding to a change in magnetic fields to send a read signal to a signal processing circuit (data channel processor) 230, and amplifies a write pulse from the signal processing circuit 230 to output a current for driving the magnetic head HD. Reference numeral 240 designates a hard disk controller that gets read data sent from the signal processing circuit 230 and performs error correction processing, and performs error correcting code processing for write data from a host and outputs results to the signal processing circuit 230. The signal processing circuit 230 performs modulation and demodulation processing suitable for digital magnetic recording and signal processing such as waveform shaping with magnetic recording characteristics in mind, and reads position information from read signals of the magnetic head HD.

Reference numeral 250 designates an interface controller that exchanges data and performs control between this system and an external apparatus. The hard disk controller 240 is connected to a host computer such as a microcomputer of a personal computer body via the interface controller 250. Reference numeral 270 designates a cache memory for buffer use for temporarily storing read data read at a high speed from the magnetic disk. The system controller 260 comprising a microcomputer judges an operation mode from a signal from the hard disk controller 240, controls parts of the system according to the operation mode, and calculates sector positions and the like, based on address information supplied from the hard disk controller 240.

As described above, the present invention made by the inventor has been described in detail based on a preferred embodiment. It goes without saying that the present invention is not limited to the above described preferred embodiment, but may be modified in various ways without departing from the spirit and the scope of the present invention. For example, although, in the above embodiment, power required after power failure is obtained by rectifying back electromotive forces of the spindle motor by diodes, only the power to the drivers 111 and 112 for driving the voice coil motor may be supplied from the back electromotive forces of the spindle motor and the power to the voice motor driving circuit (IC) 100 may be supplied from other backup power source. The power monitor circuit 213 in the spindle motor driving circuit side and the power monitor circuit 170 of the voice motor driving circuit 100 may be used in common.

Although, in the above embodiment, the level of comparison voltage in a comparator for judging the magnitude of back electromotive force may be arbitrarily set by a setting value of register 127, the level of comparison voltage may be arbitrarily set using phase elements and nonvolatile memory elements.

Although the present invention has been described as to application to a hard disk storage apparatus, which is an application field of the present invention, the present invention is not limited to such a field and can be widely used in general magnetic disk storage apparatuses.

Effects obtained by typical ones of inventions disclosed by the present patent application are briefly described below.

In a magnetic disk storage apparatus, when power supply is stopped, a magnetic head can be retracted safely and quickly so as not to be damaged.

What is claimed is:

1. A magnetic disk storage apparatus comprising:
   a first motor for rotating a magnetic disk;
   a magnetic head for reading information from storage tracks on the magnetic disk rotated by the first motor;
   a second motor for moving the magnetic head over the magnetic disk;
   a second motor driving control circuit for controlling a movement of the magnetic head by controlling drive currents of the second motor;
   a back electromotive force detecting circuit;
   a brake control circuit; and
   a retract control circuit,
   wherein the brake control circuit includes a first comparator; and a second comparator,
   wherein a first threshold voltage corresponds to a first preset speed of the magnetic head in a first direction being inward of the magnetic disk, and a second threshold voltage corresponds to a second preset speed of the magnetic head in a second direction being outward of the magnetic disk,
   wherein the first threshold voltage is inputted to a first input terminal of the first comparator, the second threshold voltage is inputted to a second input terminal of the second comparator, and a first back electromotive force of the second motor is inputted to a third input terminal of the first comparator and a fourth input terminal of the second comparator,
   wherein the first comparator compares the first threshold voltage with the first back electromotive force, and the second comparator compares the second threshold voltage with the first back electromotive force,
   wherein the back electromotive force detecting circuit detects the first back electromotive force, and the brake control circuit judges a movement speed of the magnetic head based on comparison results of the first comparator and the second comparator when a first power supply to the magnetic disk storage apparatus is stopped,
   wherein if the first comparator determines that the first back electromotive force detected when the first power supply to the magnetic disk storage apparatus is stopped is greater than the first threshold voltage, the brake control circuit judges the movement speed being greater than the first preset speed and the brake control circuit brakes the second motor,
   wherein if the second comparator determines that the first back electromotive force detected when the first power supply to the magnetic disk storage apparatus is stopped is greater than the second threshold voltage, the brake control circuit determines the movement speed being greater than the second preset speed and the brake control circuit brakes the second motor,
   wherein the retract control circuit is adapted to drive the second motor to move the magnetic head to a retract position after the brake control circuit braking the second motor when the first power supply to the magnetic disk storage apparatus is stopped,
   wherein when a predetermined time elapses after the first power supply to the magnetic disk storage apparatus is stopped, the brake control circuit judges the movement speed of the magnetic head based on comparison results of the first comparator and the second comparator.

2. The magnetic disk storage apparatus according to claim 1, wherein the retract control circuit drives the second motor to move the magnetic head to the retract position at a speed being smaller than a predetermined speed, when the first power supply to the magnetic disk storage apparatus is stopped.

3. The magnetic disk storage apparatus according to claim 2, wherein in a first operation, the brake control circuit brakes the second motor, and in a second operation, the back electromotive force detecting circuit detects the first back electromotive force, wherein the first operation and the second operation are repeated alternately, until the movement speed when the first power supply to the magnetic disk storage apparatus is stopped becomes smaller than the first preset speed, and wherein the first operation and the second operation are repeated alternately, until the movement speed when the first power supply to the magnetic disk storage apparatus is stopped becomes smaller than the second preset speed.

4. The magnetic disk storage apparatus according to claim 2, further including a setting circuit for setting judgment levels of the first threshold voltage and the second threshold voltage in order to judge the movement speed of the magnetic disk.

5. The magnetic disk storage apparatus according to claim 1, wherein when the first power supply to the magnetic disk storage apparatus is stopped, the second motor, the second motor driving control circuit, the back electromotive force detecting circuit, the brake control circuit, and the retract control circuit are supplied a second power supply from a second back electromotive force of the first motor.

6. The magnetic disk storage apparatus according to claim 5, further comprising a plurality of diodes for rectifying currents caused by the second back electromotive force of the first motor.

* * * * *